United States Patent
McClain et al.

(10) Patent No.: US 11,010,062 B2
(45) Date of Patent: May 18, 2021

(54) METHOD FOR PROVIDING READ DATA FLOW CONTROL OR ERROR REPORTING USING A READ DATA STROBE

(71) Applicant: Cypress Semiconductor Corporation, San Jose, CA (US)

(72) Inventors: Mark Alan McClain, San Diego, CA (US); Qamrul Hasan, Santa Clara, CA (US); Clifford Alan Zitlaw, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 97 days.

(21) Appl. No.: 16/160,008

(22) Filed: Oct. 15, 2018

(65) Prior Publication Data

US 2019/0212920 A1    Jul. 11, 2019

Related U.S. Application Data

(63) Continuation of application No. 15/271,527, filed on Sep. 21, 2016, now Pat. No. 10,120,590, which is a continuation of application No. 14/054,265, filed on Oct. 15, 2013, now Pat. No. 9,454,421.

(51) Int. Cl.
*G06F 3/06* (2006.01)
*G06F 11/07* (2006.01)

(52) U.S. Cl.
CPC .......... *G06F 3/0614* (2013.01); *G06F 3/0653* (2013.01); *G06F 3/0659* (2013.01); *G06F 3/0665* (2013.01); *G06F 3/0673* (2013.01); *G06F 11/0745* (2013.01); *G06F 11/0757* (2013.01); *G06F 11/0769* (2013.01); *G06F 11/0772* (2013.01)

(58) Field of Classification Search
CPC .... G06F 3/0614; G06F 3/0653; G06F 3/0659; G06F 3/0665; G06F 3/0673; G06F 11/0745; G06F 11/0757; G06F 11/0772; G06F 11/0769
USPC .......................................................... 714/50
See application file for complete search history.

(56) References Cited

U.S. PATENT DOCUMENTS

| 6,374,282 B1 * | 4/2002 | Bunton ................... H04L 63/08 709/229 |
| 6,675,243 B1 | 1/2004 | Bastiani et al. |
| 6,715,111 B2 | 3/2004 | Self et al. |
| 7,457,175 B1 | 11/2008 | Griffith et al. |

(Continued)

OTHER PUBLICATIONS

Wikipedia "IEEE_1394" page from date Oct. 10, 2013, retrieved using the way back machine, from https://web.archive.org/web/20131010014458/https://en.wikipedia.org/wiki/IEEE_1394 (Year: 2013).*

(Continued)

*Primary Examiner* — Yair Leibovich (57) ABSTRACT

A peripheral device includes a function block to provide data in response to a request from a host device, a data channel coupled with the function block to transmit the data from the function block to a host device as one or more packets, and output logic coupled with the data channel and configured to indicate validity of the data transmitted via the data channel by causing a signal to transition for each of the one or more packets of the data transmitted to the host device via the data channel, and transmit the signal to the host device.

17 Claims, 8 Drawing Sheets

(56) References Cited

U.S. PATENT DOCUMENTS

| | | |
|---|---|---|
| 8,565,034 B1 | 10/2013 | Lu et al. |
| 9,454,421 B2 | 9/2016 | McClain et al. |
| 10,120,590 B2 | 11/2018 | McClain et al. |
| 2002/0108013 A1 | 8/2002 | Coteus et al. |
| 2002/0160558 A1 | 10/2002 | Ernst et al. |
| 2004/0010652 A1 | 1/2004 | Adams et al. |
| 2004/0015765 A1 | 1/2004 | Cooper et al. |
| 2005/0047192 A1 | 3/2005 | Matsui et al. |
| 2007/0090695 A1 | 4/2007 | Kato |
| 2007/0280034 A1 | 12/2007 | Masson et al. |
| 2010/0023657 A1* | 1/2010 | Fukuda ............... G06F 13/161 710/37 |
| 2010/0229053 A1 | 9/2010 | Kushnick |
| 2010/0312928 A1 | 12/2010 | Brownell et al. |
| 2011/0128049 A1 | 6/2011 | Kang |
| 2018/0121382 A1 | 5/2018 | Lee et al. |

OTHER PUBLICATIONS

USPTO Advisory Action for U.S. Appl. No. 14/054,265 dated Dec. 4, 2015; 3 pages.
USPTO Final Rejection for U.S. Appl. No. 14/054,265 dated Sep. 17, 2015; 10 pages.
USPTO Final Rejection for U.S. Appl. No. 15/271,527 dated Jul. 2, 2018; 6 pages.
USPTO Non-Final Rejection for U.S. Appl. No. 14/054,265 dated Feb. 9, 2016; 10 pages.
USPTO Non-Final Rejection for U.S. Appl. No. 14/054,265 dated May 20, 2015; 8 pages.
USPTO Non-Final Rejection for U.S. Appl. No. 15/271,527 dated Apr. 6, 2018; 6 pages.
USPTO Notice of Allowance for U.S. Appl. No. 14/054,265 dated Jun. 2, 2016; 8 pages.
USPTO Notice of Allowance for U.S. Appl. No. 15/271,527 dated Jul. 11, 2018; 8 pages.

* cited by examiner

METHOD FOR PROVIDING READ DATA FLOW CONTROL OR ERROR REPORTING USING A READ DATA STROBE

CROSS-REFERENCE TO RELATED APPLICATIONS

This application is a continuation of U.S. patent application Ser. No. 15/271,527, filed Sep. 21, 2016, which is a continuation of U.S. patent application Ser. No. 14/054,265, filed Oct. 15, 2013, now U.S. Pat. No. 9,454,421, issued on Sep. 27, 2016, all of which are incorporated by reference herein in their entirety.

FIELD OF THE INVENTION

This invention relates to systems having peripheral devices coupled to host devices through an interface. In particular, the invention relates to providing variable latency (or flow) control and reporting errors for read data from a peripheral device, using a read data strobe signal received at a host device.

BACKGROUND

Modern electronic systems include volatile or non-volatile memory that is used to store code or application data processed by application software. Recent developments of flash non-volatile memory (Flash) and dynamic random access memory (DRAM) have reduced data corruption, such that data reliability is very high and in most cases data is read out of these devices assuming no corruption. Even with these memory types, a status register in the memory may carry information about any data read failures that do occur. However, a host usually does not read the status after every data access due to additional communication time overhead in the system that would reduce system performance.

Corruption in the data read at the peripheral may result in erroneous code or data transmission to a processing device, e.g., a central processing unit (CPU) or the like. Processing erroneous code or data in turn can lead to system failures, which are hard to detect. And, recovery from system failure is very time consuming. For example, if a memory is used in a network, this system failure could cause significant down time, which is not acceptable in many systems. Such systems need immediate notification of any detected read error and provide a signal separate from the memory read data to indicate to the host that a read error has occurred.

Many systems also transfer data at high speeds, such that the period of time during which each bit of data is valid is very short, making it difficult for the host to know the optimal point in time to capture valid data. These systems often include a signal separate from the data to indicate the optimal point in time to capture valid data. This signal is often referred to as a receive data clock (RDC), a data-in-out strobe (DQS), or read data strobe (RDS). While the RDS provides an indication of the best point within a clock cycle to capture data, the RDS is expected to transition between signal levels within a fixed number of clocks following the beginning of a read access and to continue regular transitions during any set of sequential read accesses.

SUMMARY

Provided herein are system, apparatus, methods and/or combinations and sub-combinations thereof, for using a single read data strobe (RDS) signal received at a host device from a peripheral device to perform multiple functions that indicate a variable latency from the start of a read access to when data is first valid, to provide a timing reference relative to the read data for the optimal point in time to capture the data, to control the flow of transfers in a series of read accesses by indicating when subsequent data is again valid, and to report any error in the read access of the peripheral device.

An embodiment includes a method for interpreting information from the RDS signal at the host interface. The method is based on counting clock pulses until a RDS signal transition between voltage levels is received at the peripheral controller of the host interface. According to one operative mode, data is transmitted without error when the RDS signal transitions are received at expected time intervals. According to a second operative mode of this embodiment, an error is communicated to the host and data is not transmitted from the peripheral, when the RDS signal is not received before expiration of a maximum waiting time at the peripheral controller. According to a third operative mode of this embodiment, the data is sent only when the RDS signal transitions, and these transitions may vary in the time interval between the beginning of a read access and first transfer of data or between subsequent data transfers in a series of transfers, to control the flow (rate) of transfers.

A further embodiment includes a method for detecting the read data error using a peripheral device and a received RDS signal. The operation includes loading a counter with a predetermined maximum waiting time and counting down until the RDS signal transition is received from the peripheral device. If the counter has counted down to zero before reception of the RDS signal transition at the peripheral controller, an error response is sent to the processing unit of the host device with no data transmission. Otherwise, valid data is captured and transmitted to the host.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the invention description, illustrate the present invention and, together with the detailed description, further serve to explain the principles of the invention and to enable a person skilled in the relevant art(s) to make and use the invention.

DETAILED DESCRIPTION

This description discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the description to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to use such a feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Before describing such embodiments in more detail, however, it is instructive to present an example environment in which embodiments of the present invention may be implemented.

Figure 1:
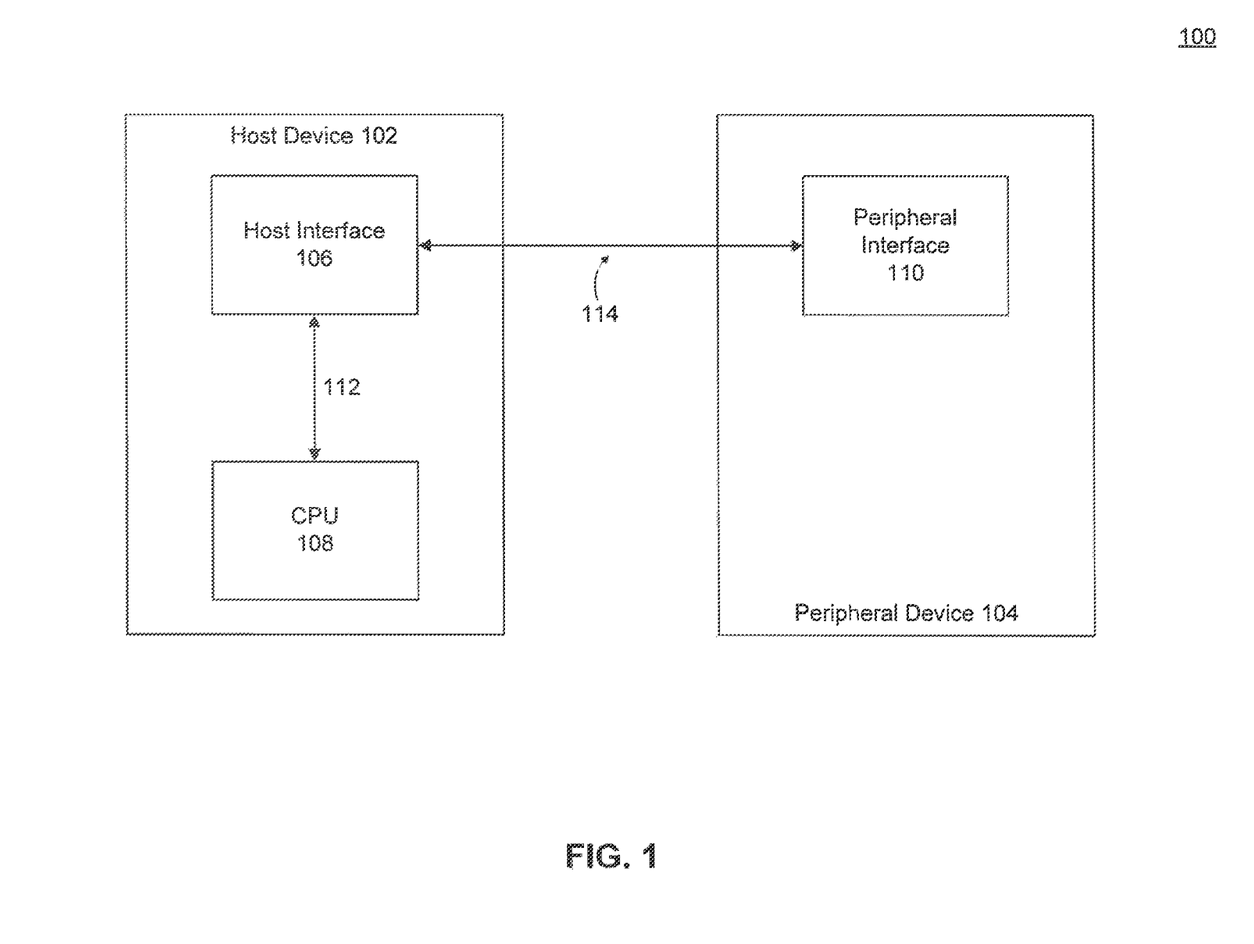
FIG. 1 illustrates an electronic device subsystem including a host coupled to a peripheral device.

FIG. 1 illustrates a system 100, according to an embodiment. In one example, system 100 is an electronic device subsystem including a host device 102 coupled to a peripheral device 104.

Host device 102 may be a host system-on-a-chip (SoC). Host device 102 may include a host interface 106 coupled to a central processing unit (CPU) 108 through an internal system bus 112. CPU 108 can be part of, but not limited to, a personal laptop or desktop computer or a mobile device (not shown).

Peripheral device 104 may include a peripheral device interface 110.

In one example, host device 102 may communicate with peripheral device 104 through an interface bus 114, which connects host interface 106 to peripheral interface 110.

In one example, peripheral device 104 can be, but is not limited to, a NAND Flash memory, a NOR Flash memory, or a DRAM memory.

It is to be appreciated that, while FIG. 1 shows only one host interface 106, host device 102 may include additional host interfaces.

Figure 2:
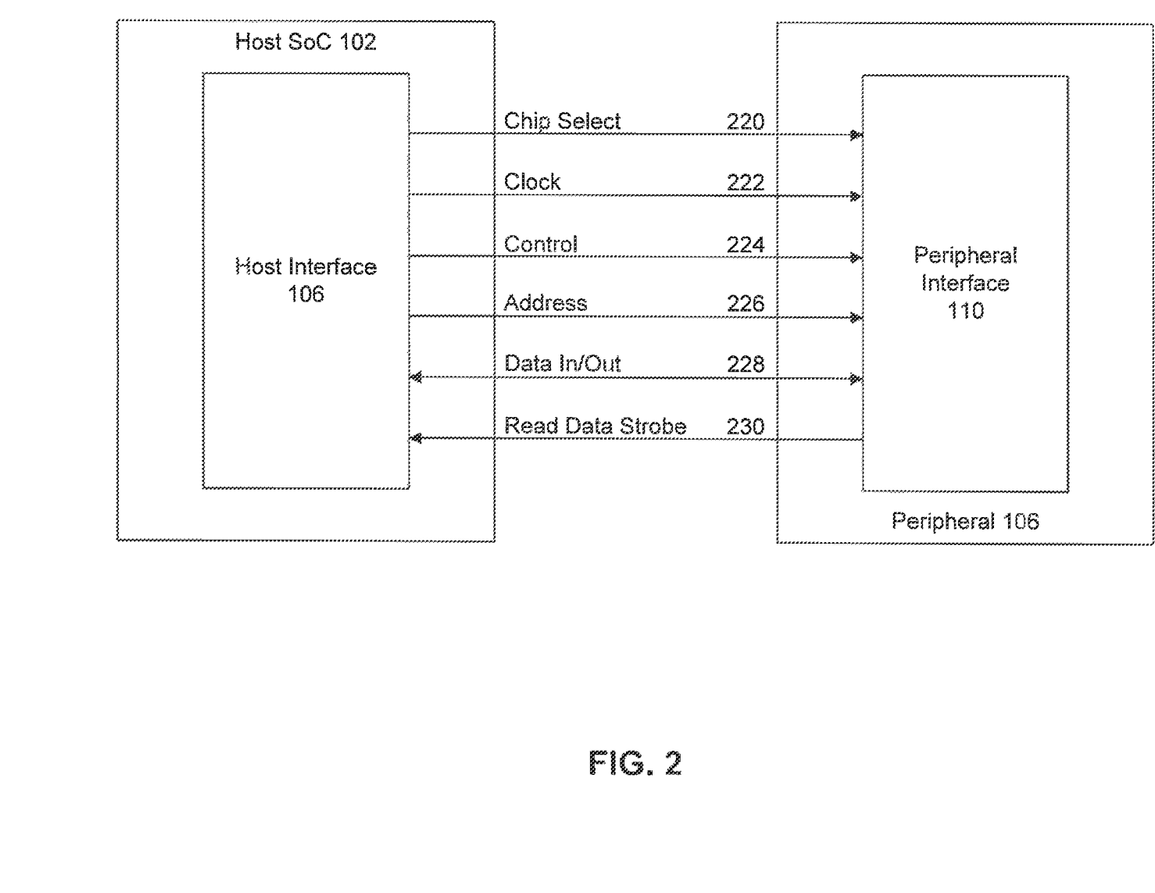
FIG. 2 illustrates interface connections between a host interface and a peripheral interface.

FIG. 2 illustrates detailed interface connections between host interface 106 and peripheral interface 110, according to an embodiment.

In this example, interface bus 114 connects host interface 106 to peripheral interface 110 through one or more channels or signal paths between peripheral device 104 and host device 102. It should be noted that the term "signal" may be used interchangeably herein to refer to the actual information or the channel connection itself that is used to transmit the signal information, as it may be apparent to one skilled in the relevant art.

In the example shown, there may be four uni-directional channels (220-226) from host interface 106 to peripheral interface 110 and one uni-directional channel 230 from peripheral interface 110 to host interface 106. A chip select channel 220 may be used to select one of many chips in peripheral device 104 during an operation. A clock signal channel 222 may be used as a reference clock from host device 102 to peripheral device 104. A control channel 224 transmits control information. An address channel 226 may be used to transmit the address location to peripheral interface 110. A read data strobe (RDS) signal may be transmitted through channel 230 from peripheral interface 110 to host interface 106. In one example, the RDS signal is used to validate data transmission and indicate read error or variable timing information to host device 102.

In one example, there may be a bi-directional channel (228) from peripheral interface 110 to host interface 106. Data in/out signals may be transmitted through bi-directional channel 228 to send data from peripheral interface 110 to host interface 106. While in this example the data in/out signal is transmitted through bi-directional channel 228, it is to be appreciated that two different uni-directional channels may also be used in place of the bi-directional channel. The control, address, data in/out channels may also share a common set of signals via time division multiplexing.

Figure 3:
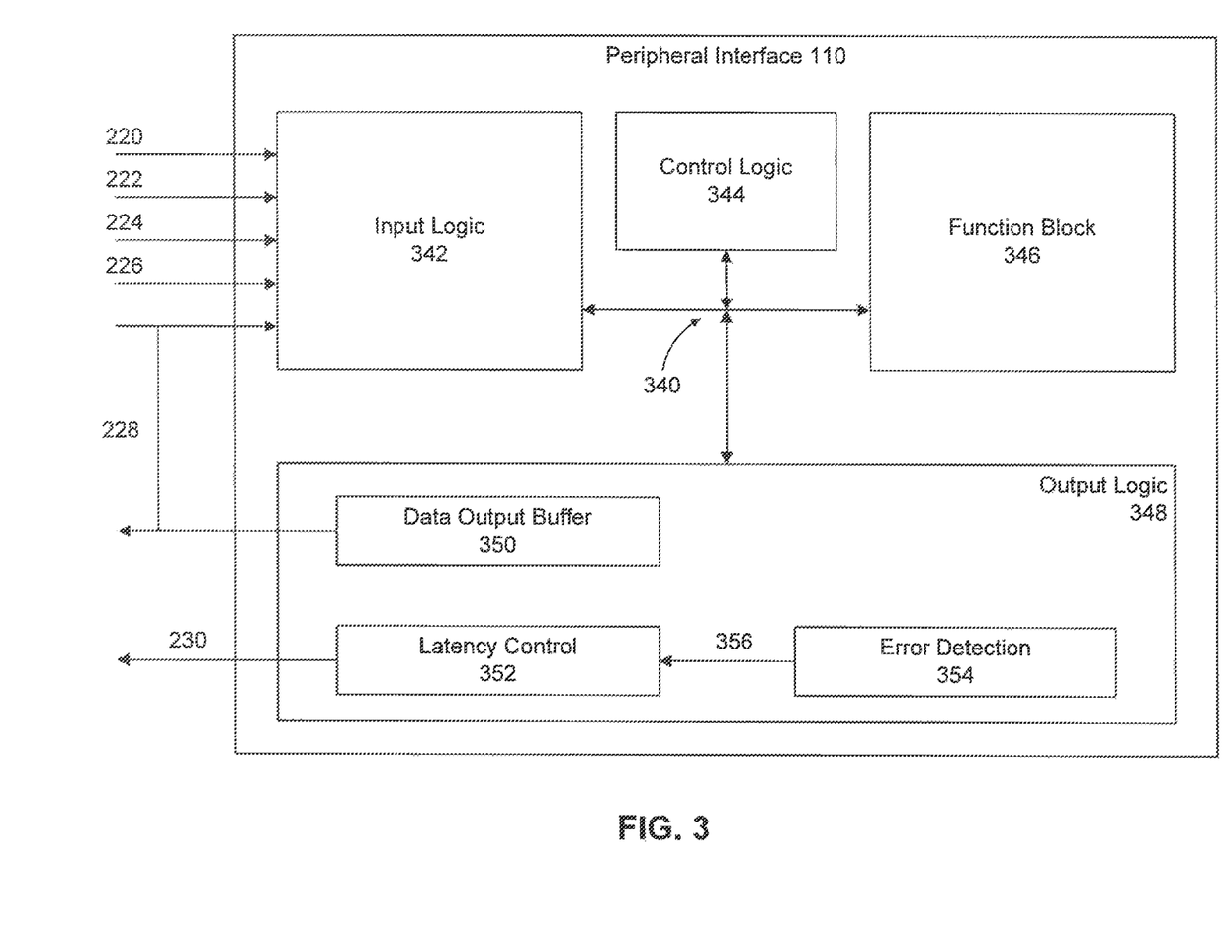
FIG. 3 illustrates a peripheral interface, according to an embodiment of the disclosure.

FIG. 3 is a more detailed internal block diagram of peripheral interface 110, according to an embodiment. In this example, peripheral interface 110 may include several logic blocks coupled to one another through interface connections 340. For example, input logic 342, control logic 344, function block 346, and output logic 348.

In one example, input logic block 342 receives chip select signal from channel 220, the reference clock signal from channel 222, control information from channel 224, address information from channel 226, and have data input or output signals connect through channel 228.

In one example, function block 346 determines a function performed by peripheral device 104.

In one example, output logic 348 is responsible for communicating data in channel 228 and RDS signal in channel 230 back to host device 102.

In one example, control logic block 344 communicates with input logic 342, that may determine the time and order of different function execution at peripheral interface 110.

Output logic block 348 may include a data output buffer 350, latency control mechanism 352, and error detection block 354. Data output buffer may store data for transmission to host device 102 (FIG. 1) through data in/out channel 228. Latency control mechanism 352 may manage the RDS output so that it matches the time when data is ready for transmission, and communicates the RDS signal back to host device 102. Error detection block 354 may be used to identify when there is an error in the data and communicates with latency control mechanism 352 through channel 356 to prevent transmission of the RDS signal.

Figure 4:
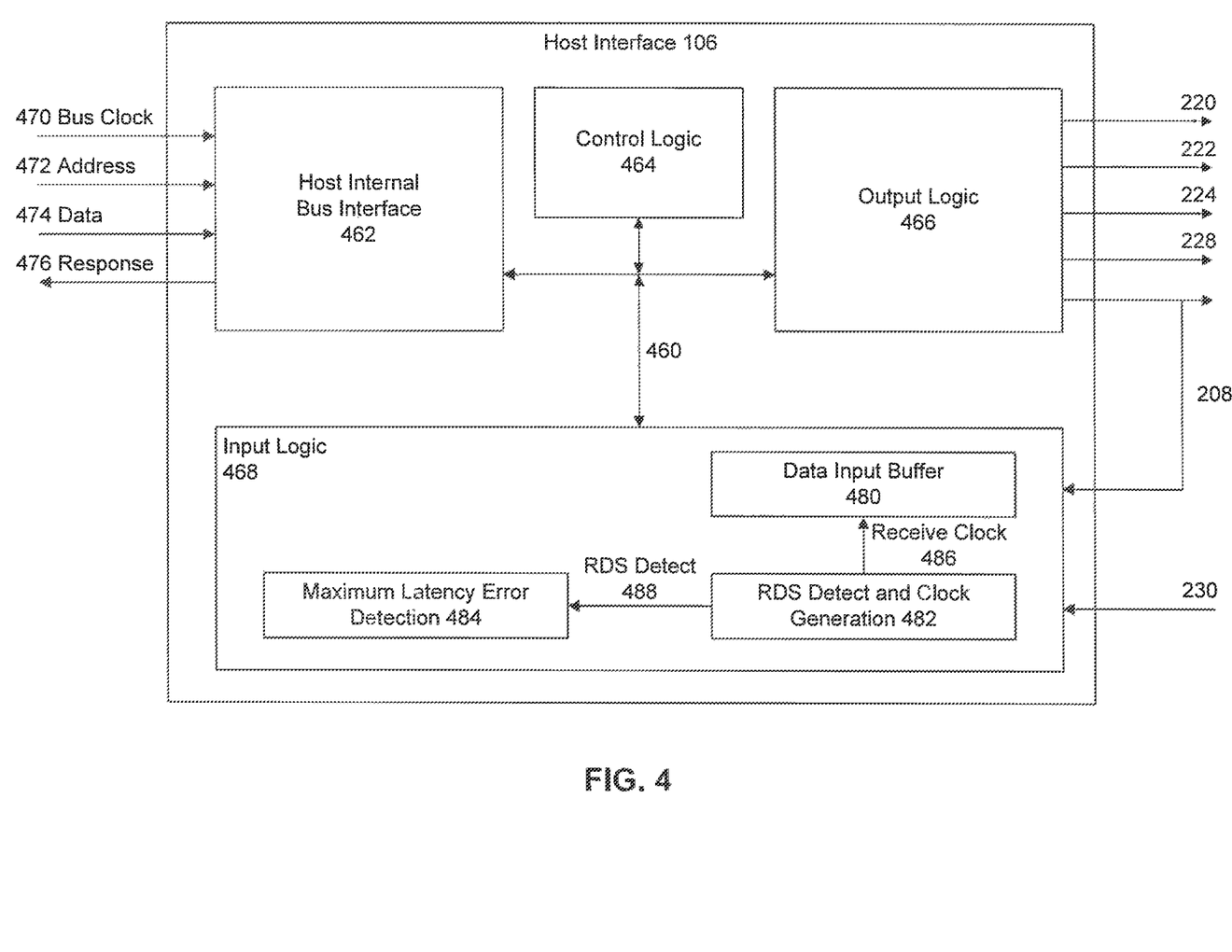
FIG. 4 illustrates a host interface, according to an embodiment of the disclosure.

FIG. 4 is a more detail internal block diagram of host interface 106, according to an embodiment. In this example, host interface 106 may include several logic blocks coupled to one another through interface connections 460. The logic blocks may include input logic 462, control logic 464, and output logic 466.

In one example, output logic 466 can be used to transmit one or more signals, e.g., chip select, reference clock, control, address, and data out, from host interface 106 to peripheral interface 110 (FIG. 1), through channels 220 to 228.

In one example, input logic 462 receives and processes data through channel 228 and the RDS signal through channel 230 from the peripheral 104, a host internal bus interface 468 configured to communicate with the central processing unit 108 through internal system bus 112 by receiving the internal system clock through channel 470, address data through channel 472, and transmitting read data through channel 474 and a response signal through channel 476 to indicate valid or erroneous transmission. In one example, a control logic 464 may determine the time and order of different function execution at host interface 106.

Input logic 468 may further comprise a data input buffer 480 responsible for receiving the read data through channel 228 from peripheral device 104, an RDS detect and clock generation circuit 482, which, in one example, may receive the RDS signal through channel 230 and delay it so that its rising edge is shifted to occur in the middle of the valid data packet; and a latency error detection circuit 484, which can detect whether an error has occurred. The delayed RDS signal through channel 230 may act as a receive-clock and may be used for data capturing.

In one example, the delayed RDS signal may be communicated to data input buffer 480 through channel 486. The RDS may be communicated to the latency error detection circuit 484 through channel 488. An error response from circuit 484 may then be transmitted back to host CPU 108 through interface connections 460, host internal bus interface 462, and response channel 476.

Figure 5:
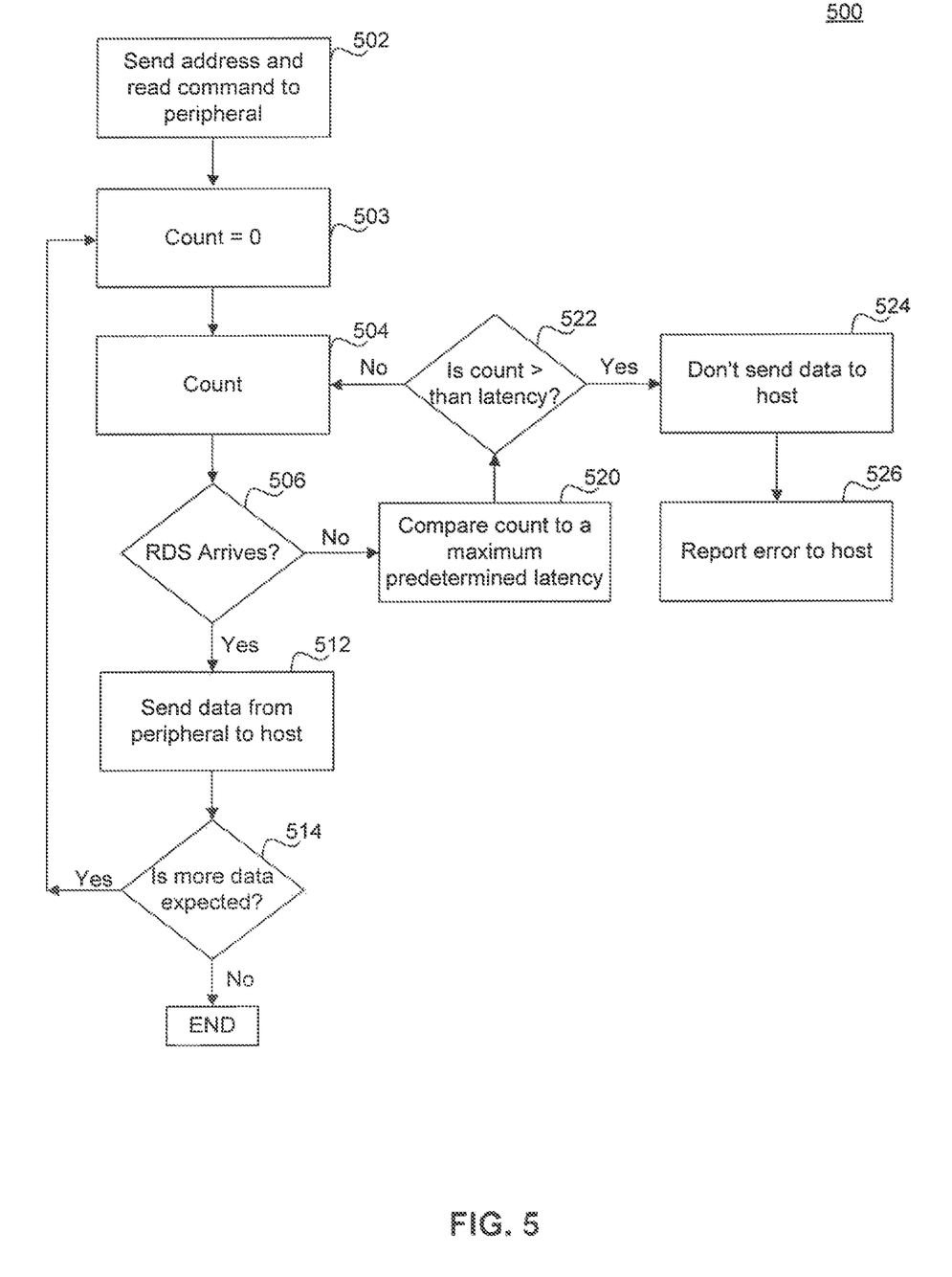
FIG. 5 is a flow diagram depicting a method, according to an embodiment of the disclosure.

FIG. 5 shows a flow diagram outlining a method 500, according to an embodiment. For example, method 500 can detect an RDS signal and identify valid, or delayed data read and transmission between peripheral device 104 and host device 102. It is to be appreciated that method 500 may not occur in the order shown, nor include all operations shown. Merely for convenience, elements in FIGS. 1-4 will be used to perform operations shown in method 500.

In step 502, a read command and address is transmitted from a host device interface to a peripheral device interface.

In step 504, once the peripheral device has obtained enough information to identify the read command and begin access of the location, a counter in the host interface begins counting clock pulses generated from a reference clock. In one example, a counter counts up from a zero value. It is to be appreciated by one skilled in the relevant art that other counting schemes may be employed, such that the counter may be able to track the latency values.

In step 506, a determination is made whether the RDS signal has been received. Receiving the RDS signal refers to toggling of the signal from one logic state to another. This may be from a high logic state to a low logic state, or vice-versa. The terms "arrival" and "reception" of the RDS signal may be interchangeably used herein to refer to toggling of the RDS signal from one logic state to another. If the RDS signal has been received, data is reported from peripheral device 104 to host device 102 (step 512). As such, the RDS signal may be used as a time reference to capture a read data at the host device interface 106. Once a read data is reported to host device 102 (step 512), a determination is made whether more data is expected (step 514). If more data is expected, method 500 resets the count to zero and restarts at step 503, and if not, method 500 ends.

Returning to step 506, if the RDS signal is not received, method 500 branches out to step 520, where the counter value is compared to a predetermined maximum latency. The predetermined maximum latency may be programmable and may be set by the software during an idle state of the system. There may be a plurality of predetermined latencies, for example one for the initial access time until the first set of data is sent back to host device 102 from the peripheral device 104, and a second latency related to the delay in reading data at a boundary crossing between data pages in peripheral device 104.

If in step 522 the counter value is below the maximum predetermined latency, the method returns to step 504, i.e. the counter continues to count until the RDS signal arrives. If the counter value is above the maximum predetermined latency before the RDS signal has been received, in step 524 the data is not sent to host device 102, and an error is reported in step 526, as the maximum waiting time for RDS signal reception has been exceeded. After one cycle has been completed according to method 500, the system may proceed to an idle state or a subsequent read operation (not shown in FIG. 5).

Method 500 may be used with a first predetermined maximum time of receipt and a second predetermined maximum time of receipt (not shown in FIG. 5). For example, method 500 may be used for receiving the RDS signal before a first predetermined maximum time of receipt, thereby controlling the latency from a read request to return of data for a first data returned. Further, the RDS signal may be received at any time before a second predetermined maximum time of receipt. As such, method 500 allow the controlling of the latency between data transfers to provide flow control of a rate of transfers in a series of data transfers. Further, method 500 allows receiving the RDS signal for each data element transfer of a plurality of data element transfers, when the read request is for the return of multiple read data elements.

The method of operation according to the embodiment described in FIG. 5 indicates that the RDS signal 230 may serve an at least threefold functionality. First, it may be used as a receive-data clock relaying timing information and indicating when the data is valid on interface bus 114, when the RDS signal in channel 230 is received. Second, it may provide variable latency information by delaying the first or subsequent data transfers in a series of transfers. Third, it may indicate a read data error and send an error response without data transmission from peripheral device 104 to host device 102, when it is not received before expiration of a time period corresponding to a predetermined maximum latency time. It is to be appreciated by one skilled in the art that additional functionalities may be imparted to the RDS signal according to the various embodiments described herein.

According to one aspect of this disclosure, the read data error may refer to the initial access of a data page, or a page boundary crossing at a peripheral device, or any other operation that may require some timing delay. The read operation may be any of single word read, burst read, where at least two words are read in sequence, or wrapped read where data read may begin for example in the middle of a page, continue until the end of an aligned block of the same word size, then return to the beginning of the same word size block and continue to the point where the data reading begun.

Figure 6:
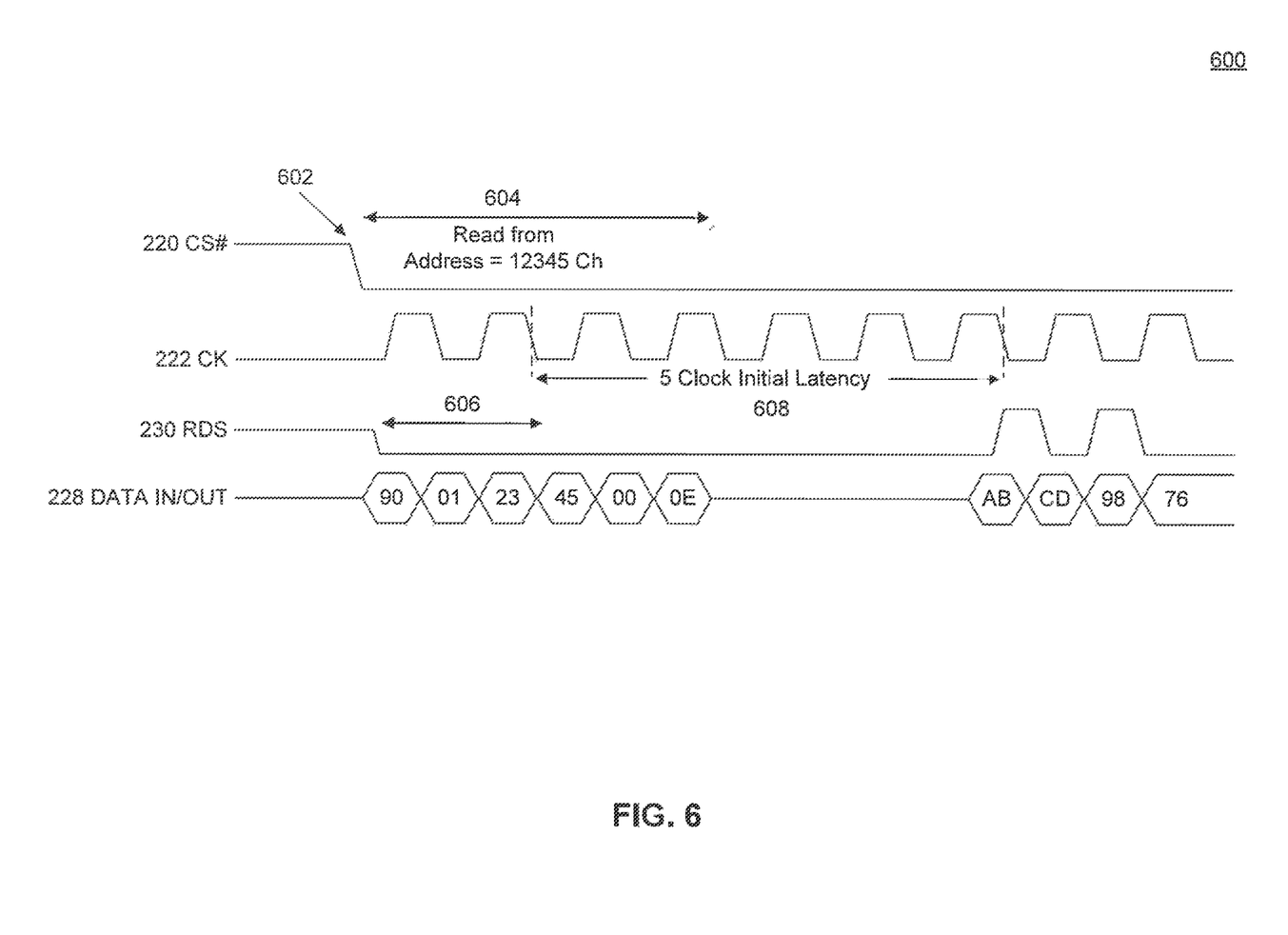
FIGS. 6, 7, and 8 are timing diagrams, according to an embodiment of the disclosure.

FIG. 6 shows a timing diagram 600 at an interface bus when there are no errors in the data transmission, according to embodiments of the disclosure. For example, data packets associated with a peripheral device that is a memory device are used. In this example there is a predetermined latency of five clock pulses. However, one skilled in the pertinent art may appreciate that it is not limited to this particular device or latency time and that similar timing diagrams may be produced for other types of peripherals and plurality of first predetermined latency times, according to the example embodiment of this disclosure.

At time 602, a signal in chip select channel 220 and a RDS signal in channel 230 toggle from a high logic state ("high") to a low logic state ("low") to indicate the onset of a read operation. At the same time 602, the read command and data address are sent from CPU 108, to peripheral device 104, through host interface 106 and interface bus 114. The data packets transmitted from CPU 108 of host device 102 to peripheral device 104 appear in data in/out channel 228 of the interface bus 114 during time period 604. For example, data packets "90", "01", "25", "45", "00", "0E", which are coded to indicate a read command and the address location to peripheral device 104.

After time period 606, peripheral interface 110 has received adequate information to begin access of the memory. At this time, a counter (not shown) begins to count clock pulses as generated by the clock signal in channel 222 and host interface 106 waits for the RDS signal in channel 230. In this example, it is assumed that the initial value of the counter has been set to zero, however, the implementation is not limited to this counting scheme.

During time period 608, a five clock pulse latency occurs. RDS signal in channel 230 toggles from low to high, indicating that it has been received at host interface 106. At the same time, data in/out channel 228 transmits data from peripheral device 104 back to host device 102, as indicated by the data packets "AB", "CD", "98", "76", which are validated by the rising and falling edges of the RDS signal in channel 230.

In one implementation of this embodiment, the host interface 106 issues a response through internal system bus 112 to CPU 108, corresponding to valid transmission without error. This may be an "OKAY" response when the internal system bus is an AHB or AXI bus, but it is not limited to this implementation.

Figure 7:
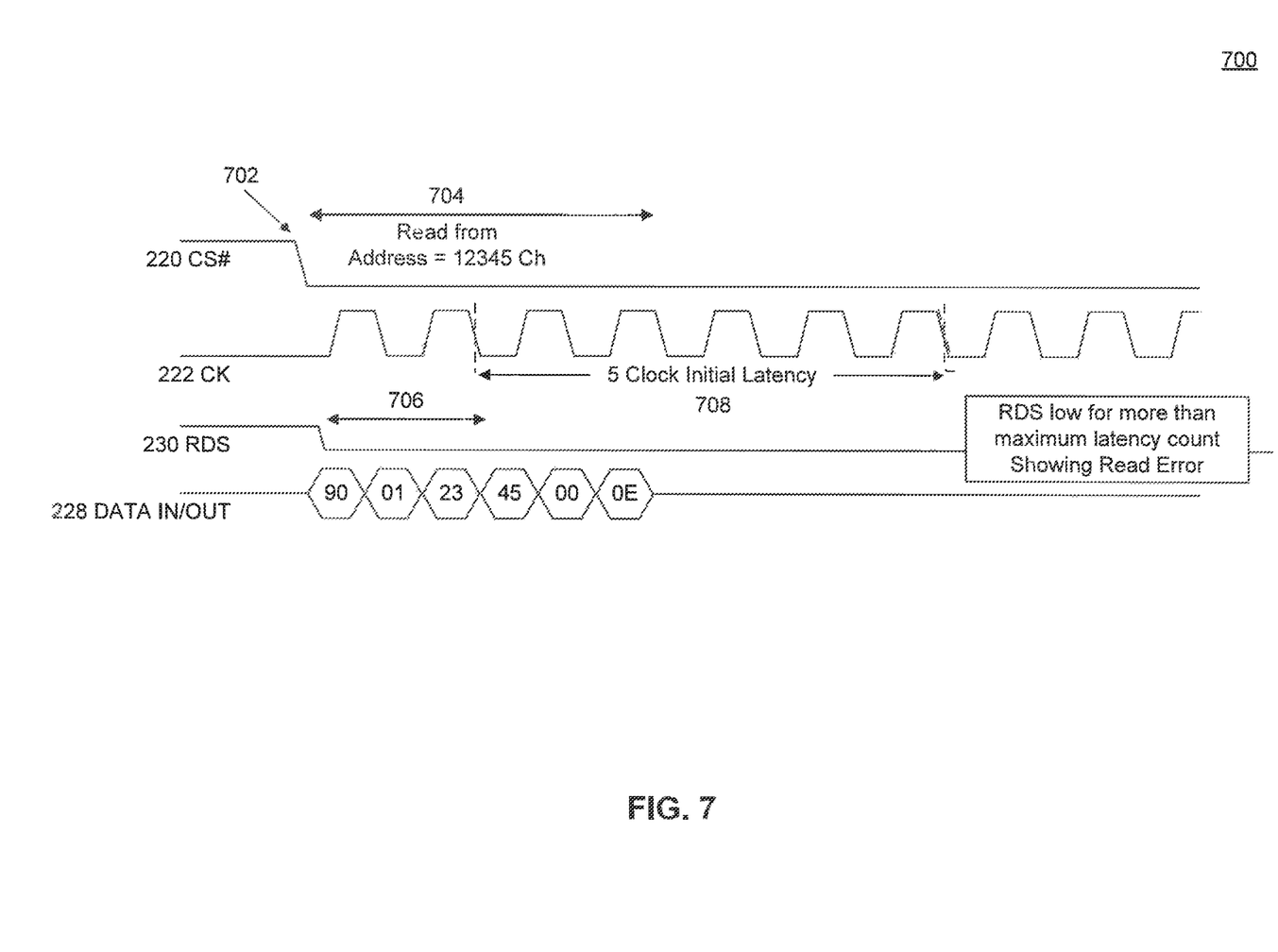

FIG. 7 shows a timing diagram 700 at an interface bus when there is an error after the initial access of a data page, according to embodiments of the disclosure. In this example, there is a first predetermined latency of five clock pulses and the second predetermined latency is equal to the first predetermined latency. However, similar timing diagrams can be produced for other predetermined latencies or for a second predetermined latency greater than the first predetermined latency.

At time 702, a chip select signal in channel 220 and a RDS signal in channel 230 toggle from high to low to indicate the onset of a read operation. At the same time 702, the read command and data address are sent from CPU 108, to peripheral device 104, through host interface 106 and interface bus 114. The data packets transmitted from CPU 108 of host device 102 to peripheral device 104 appear in data in/out channel 228 of interface bus 114 during time period 704. For example, data packets "90", "01", "25", "45", "00", "0E", which are coded to indicate a read command and the address location to peripheral device 106.

After time period 706, peripheral interface 110 has received adequate information to begin access of the memory. At this time, a counter begins to count clock pulses as generated by the clock 222 and host interface 106 waits for the RDS signal in channel 230. In this example, it is assumed that the initial value of the counter has been set to zero, however, the implementation is not limited to this counting scheme.

After time period 708 and five clock pulses, the RDS signal has not toggled back to high, indicating an error in the data. The data is not transmitted through the data in/out channel 228. In one implementation of this embodiment, host interface 106 issues an error response through internal system bus 112 to CPU 108, corresponding to error in the read data. For example, the error message can be a "SLVERR" for an AXI or AHB internal system bus, but it is not limited to this implementation.

Figure 8:
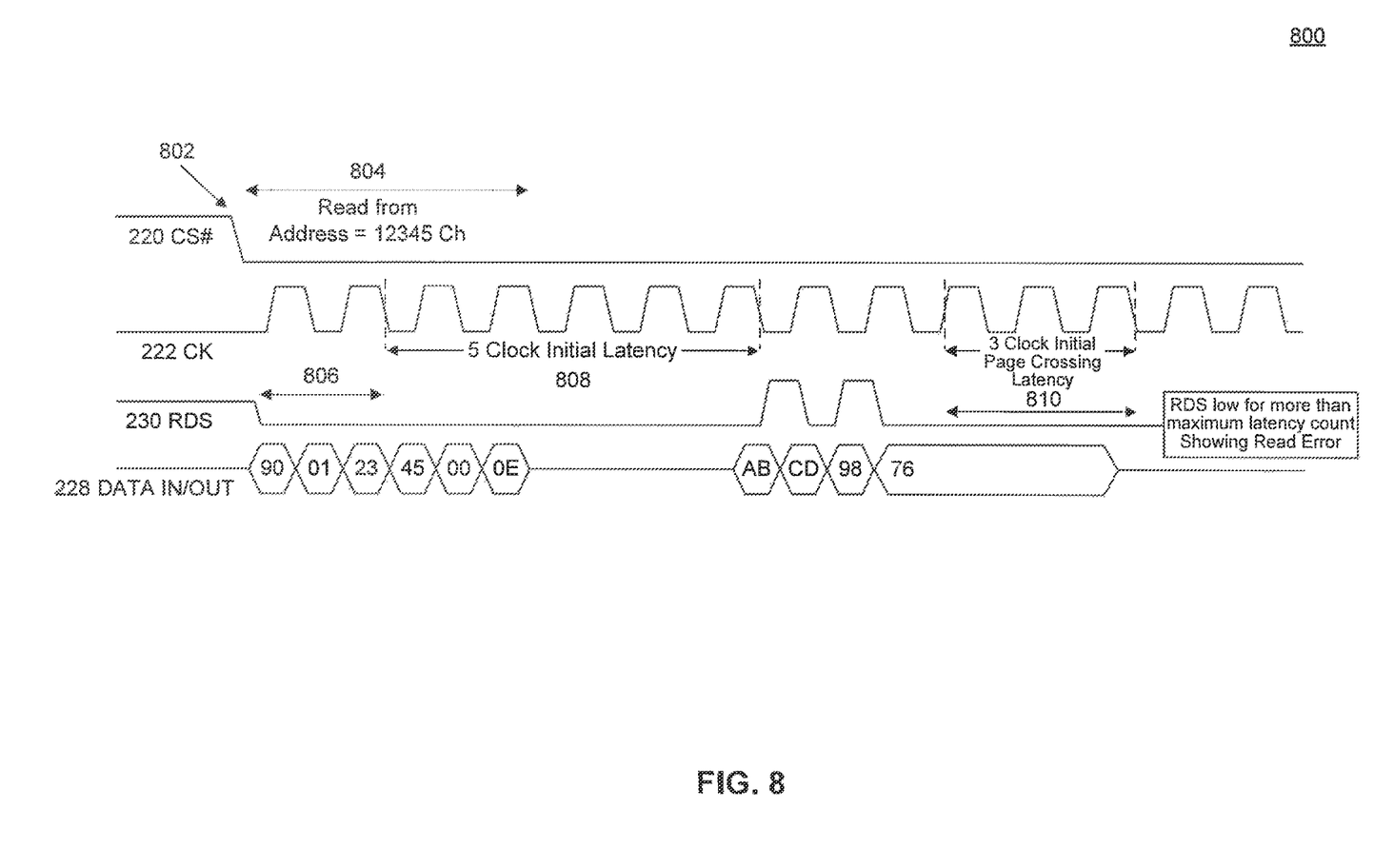

FIG. 8 shows a timing diagram 800 at an interface bus when there is an error at a page boundary crossing, according to embodiments of the disclosure. In this example, there is a plurality of first predetermined latencies: one comprising five clock pulses and referring to the initial access latency, and one comprising three clock pulses and referring to a latency across a boundary crossing.

At time 802, the chip select signal in channel 220 and a RDS signal in channel 230 toggle from high to low to indicate the onset of a read operation. At the same time 802, the read command and data address are sent from CPU 108, to peripheral device 104, through host interface 106 and interface bus 114. The data packets transmitted from CPU 108 of host device 102 to peripheral device 104 appear in the data in/out channel 228 of interface bus 114 during the time period 804. For example, data packets "90", "01", "25", "45", "00", "0E", which are coded to indicate a read command and the address location to peripheral device 106.

After time period 806, the peripheral interface 110 has received adequate information to begin access of the memory. At this time, a counter begins to count clock pulses as generated by the clock in channel 222 and host interface 106 waits for the RDS signal in channel 230. In this example, it is assumed that the initial value of the counter has been set to zero, however, the implementation is not limited to this counting scheme.

During time period 808, a five clock pulse latency occurs. RDS signal in channel 230 toggles from low to high, indicating that it has been received at host interface 106. At the same time, data in/out channel 228 transmits data from peripheral device 104 back to host device 102, as indicated by the data packets "AB", "CD", "98", "76", which are validated by the rising and falling edges of the RDS signal 230.

After the last data packet "76" has been transmitted across data in/out channel 228, the RDS signal in channel 230 has not toggled back to high before expiration of time period 810. Since the page boundary crossing latency has been set to three clock pulses, this indicates a read data error across a page boundary. The data is not transmitted through data in/out channel 228, and an error response is sent to CPU 108.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the, hardware, methods and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A peripheral device, comprising:
a function block configured to provide data in response to a request from a host device;
a data channel coupled with the function block and configured to transmit the data from the function block to the host device as one or more packets; and
output logic coupled with the data channel and configured to:
    indicate validity of the data transmitted via the data channel by causing a signal comprising a read data strobe signal to transition for each of the one or more packets of the data transmitted to the host device via the data channel, and
    transmit the signal to the host device, wherein the output logic further comprises a latency control circuit configured to, in response to the request, indicate the validity of the data prior to lapse of a maximum latency count.

2. The peripheral device of claim 1, wherein:
the signal comprises a read data strobe signal; and
the output logic further comprises a latency control circuit configured to cause the signal to transition for each of the one or more packets by alternating the signal between an asserted state and a deasserted state.

3. The peripheral device of claim 1, wherein:
the signal comprises an error detection signal; and
the output logic further comprises an error detection circuit configured to, after receiving the request from the host device, prevent transitioning of the signal for a duration exceeding a first maximum latency count in response to an error caused by the request.

4. The peripheral device of claim 1, wherein:
the signal comprises an error detection signal;
the data channel is configured to, prior to lapsing of a first maximum latency count, transmit the data from the function block to the host device in response to the request from the host device; and
the output logic further comprises an error detection circuit configured to indicate an error while transmitting the data to the host device via the data channel by preventing transitioning of the signal for a duration exceeding a second maximum latency count.

5. A method, comprising:
providing data from a function block in response to a request from a host device;
transmitting the data from the function block to the host device as one or more packets via a data channel;
indicating validity of the data transmitted via the data channel by causing a signal to transition for each of the one or more packets of the data transmitted to the host device via the data channel;
indicating, in response to the request, the validity of the data prior to lapse of a maximum latency count, wherein the signal comprises a read data strobe signal; and
transmitting the signal to the host device.

6. The method of claim 5, further comprising:
for each of the one or more packets, causing the signal to transition by alternating the signal between an asserted state and a deasserted state, wherein the signal comprises a read data strobe signal.

7. The method of claim 5, further comprising:
after receiving the request from the host device, preventing transitioning of the signal for a duration exceeding a first maximum latency count in response to an error caused by the request.

8. The method of claim 5, wherein:
transmitting the data from the function block to the host device is performed in response to the request from the host device and occurs prior to lapsing of a first maximum latency count; and
the method further comprises indicating an error while transmitting the data to the host device via the data channel by preventing transitioning of the signal for a duration exceeding a second maximum latency count.

9. The method of claim 5, further comprising:
receiving the signal at an interface of the host device;
capturing the data from the one or more packets based on the transitions of the signal;
generating a count value by counting a plurality of clock cycles after a first transition of the signal; and
detecting an error based on determining that the count value exceeds a maximum latency count.

10. The method of claim 9, further comprising counting the plurality of clock cycles by:
resetting the count value after the request is transmitted from the host device, and incrementing the count value for each of a plurality of clock cycles detected after resetting the count value and prior to a transition of the signal.

11. A system, comprising:
a host device configured to transmit a request for data; and
a peripheral device comprising:
   a function block configured to provide the data in response to receiving the request from the host device,
   a data channel coupled with the function block and configured to transmit the data from the function block to the host device as one or more packets, and
   output logic coupled with the data channel and configured to:
      indicate validity of the data transmitted via the data channel by causing a signal comprising a read data strobe signal to transition for each of the one or more packets of the data transmitted to the host device via the data channel, and
      transmit the signal to the host device, wherein the output logic further comprises a latency control circuit configured to, in response to the request, indicate the validity of the data prior to lapse of a maximum latency count.

12. The system of claim 11, wherein:
the signal comprises a read data strobe signal; and
the output logic further comprises a latency control circuit configured to cause the signal to transition for each of the one or more packets by alternating the signal between an asserted state and a deasserted state.

13. The system of claim 11, wherein:
the output logic further comprises an error detection circuit configured to, after receiving the request from the host device, prevent transitioning of the signal for a duration exceeding a first maximum latency count in response to an error caused by the request.

14. The system of claim 11, wherein:
the data channel is configured to, prior to lapsing of a first maximum latency count, transmit the data from the function block to the host device in response to the request from the host device; and
the output logic further comprises an error detection circuit configured to indicate an error while transmitting the data to the host device via the data channel by preventing transitioning of the signal for a duration exceeding a second maximum latency count.

15. The system of claim 11, wherein:
the host device is further configured to:
receive the signal at an interface of the host device, and
capture the data from the one or more packets based on the transitions of the signal, wherein the signal comprises a read data strobe signal; and
the host device further comprises a maximum latency error detection circuit configured to:
   generate a count value by counting a plurality of clock cycles after a first transition of the signal, and
   detect an error when the count value exceeds a first maximum latency count.

16. The system of claim 15, wherein the maximum latency error detection circuit is configured to count the plurality of clock cycles by:
resetting the count value after the request is transmitted from the host device, and
incrementing the count value for each of a plurality of clock cycles detected after resetting the count value and prior to a transition of the signal.

17. The system of claim 15, wherein the maximum latency error detection circuit is further configured to:
reset the count value in response to a first transition of the signal occurring prior to lapse of the first maximum latency count;
after resetting the count value, increment the count value for each of a plurality of clock cycles detected prior to a second transition of the signal; and
detect an error when the count value exceeds a second maximum latency count.

* * * * *